UNITED STATES PATENT OFFICE.

THEODORE DWIGHT WILLIAMS, OF CHICAGO, ILLINOIS.

IMPROVEMENT IN COMPOUND FOR STUFFING AND FINISHING LEATHER.

Specification forming part of Letters Patent No. 107,579, dated September 20, 1870.

*To all whom it may concern:*

Be it known that I, Dr. THEODORE DWIGHT WILLIAMS, of the city of Chicago, State of Illinois, have invented a new and Improved Combination of Animal Matter to be used and applied as Curriers' Stuffing and Finish to Leather; and, furthermore, be it known that I do declare that the following is a full and exact description thereof.

The nature of my invention consists in combining neat's-foot, bank, straits, olive, fish, or horse oil with glycerine and tallow, by and through the presence of glycerole of egg, in quantities in accordance with the following specifications, and permitting the combining of an additional quantity of either of the aforesaid ingredients, for the purpose of adding to or reducing its common density, without dissimilating or degenerating its original and perfect chemical union. The complete union of these ingredients is dependent upon the glycerole of egg, which substantiates my improvement, and thus brings these animal oils and fats into a perfect homogeneous mass or assemblage.

Glycerole of egg is prepared by adding together five (5) parts of egg (white and yolk) and four (4) parts of glycerine.

The following are the constituents and their respective quantities of my improved curriers' stuffing and finish, together with manner of putting them together: first, mix glycerole of egg, three parts; glycerine, five parts; second, mix neat's-foot oil, four parts; tallow, (consistency of the oil,) two parts. While the oil is warm (not hot) stir in the No. 1, and continue to stir until quite cold and stiff.

I claim that this constituent, glycerole of egg, is that which induces the perfect chemical union of the several ingredients by its affinity for both the oils and fats, and therein its power of suspension of same; also, I claim that, to a great extent, it prevents the loss of oils and fats, which are carried into the leather by its presence and power of assimilating, while being subjected to the process of crimping, treeing, &c., in the manufacturing of leather into boots and shoes; and, furthermore, by its power of retaining large proportion of these oils and fats, it thereby remains soft and pliable, and that it is in no possible manner injurious to the leather.

What I especially claim as my invention, and desire to secure by Letters Patent, is—

This compound, which is denominated "improved curriers' stuffing and finish for leather," made by combining glycerole of egg with other ingredients, herein specified.

DR. THEODORE DWIGHT WILLIAMS.

Witnesses:
D. S. WILLIAMS,
N. G. BRADLEY.